E. A. HUCKLE.
AUTOMATIC ADVERTISING DEVICE.
APPLICATION FILED SEPT. 6, 1910.

1,006,480.

Patented Oct. 24, 1911.

Witnesses.
R. C. Braddock
Emory L. Groff

Inventor.
ERNEST ALFRED HUCKLE
By
HIS ATTORNEY.

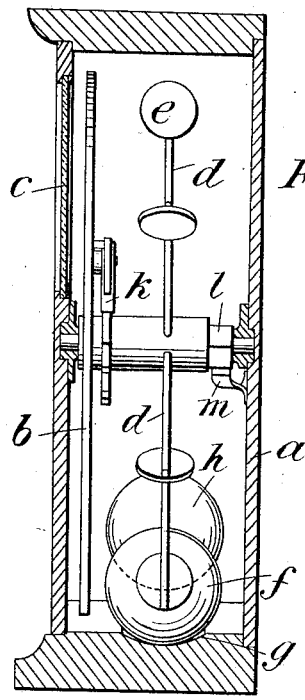
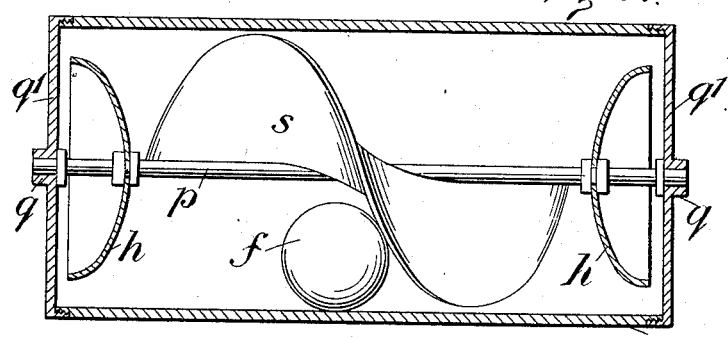
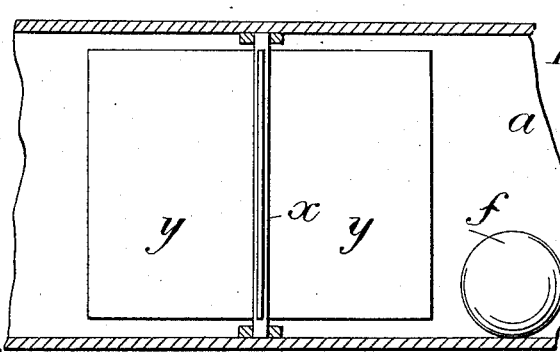

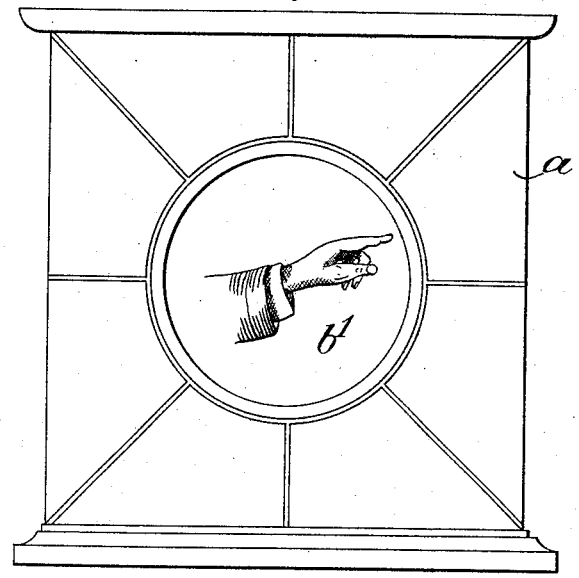
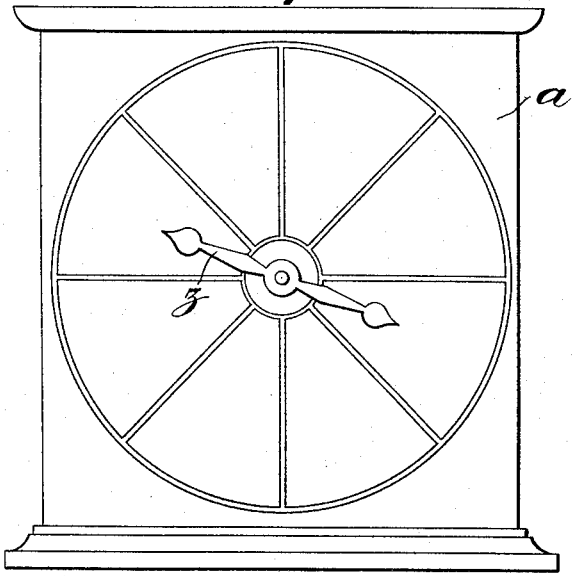

UNITED STATES PATENT OFFICE.

ERNEST ALFRED HUCKLE, OF TWICKENHAM, ENGLAND.

AUTOMATIC ADVERTISING DEVICE.

1,006,480.  Specification of Letters Patent.  Patented Oct. 24, 1911.

Application filed September 6, 1910. Serial No. 580,491.

*To all whom it may concern:*

Be it known that I, ERNEST ALFRED HUCKLE, a subject of the King of Great Britain, residing at Twickenham, Middlesex, England, have invented new and useful Improvements in Automatic Advertising Devices, of which the following is a specification.

This invention relates to a new or improved automatic advertising device and has for its object to provide an apparatus which is capable of attachment to a vehicle, boat, or other vibrating or moving object, the movement of which being imparted to the apparatus produces an intermittent change of the advertisement, being displayed, or causes an indicator or object to be moved and to change its position from one advertisement to another or to change its position with relation to a single pictorial or other advertisement.

Figure 1:
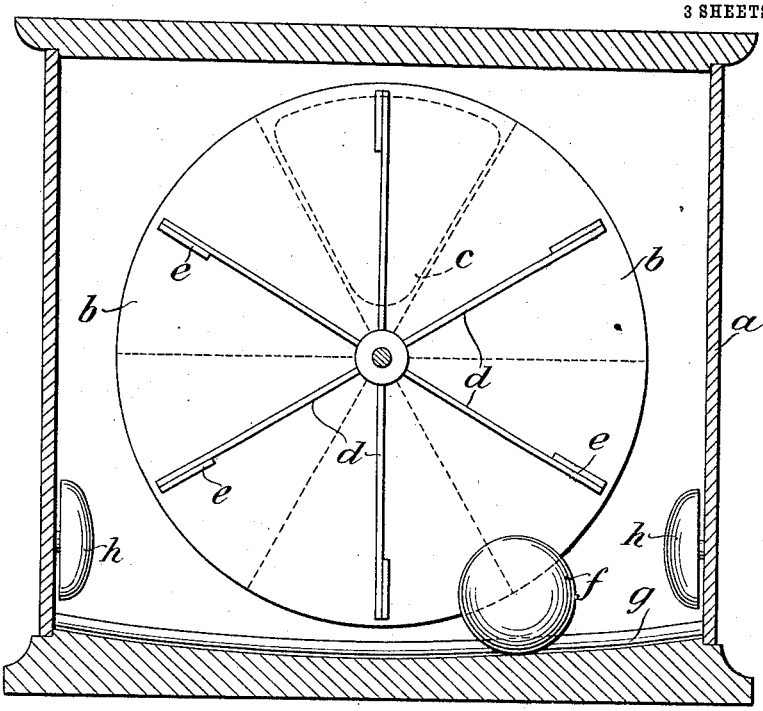
Figure 2:
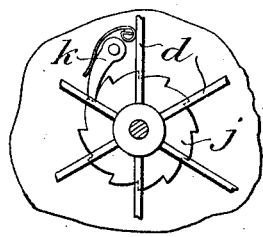
Figure 3:
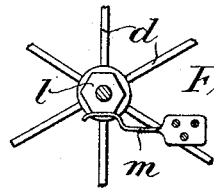
Figure 4:
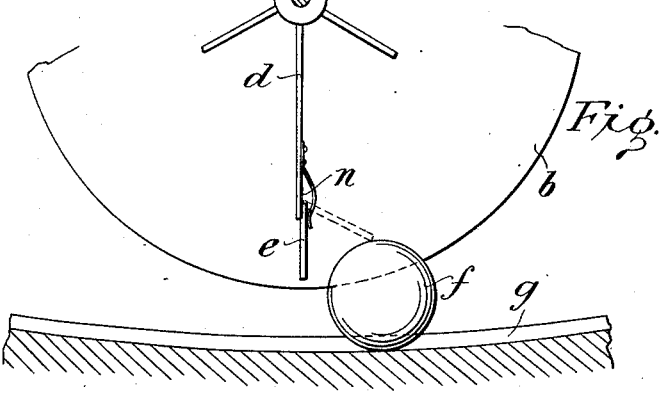

According to this invention a spider, paddle wheel, helix vane, or the like all of which devices may for the purposes of this specification be classed as vanes, is revolubly mounted within a casing preferably dust tight in such a position that the peripheral parts of the spider, paddle wheel, vane, or helix may extend into the path of one or more balls or rollers free to move about on the floor of the casing. Therefore as the casing vibrates or oscillates, owing to the movement of the vehicle or support, the ball or roller strikes against the peripheral parts of the revoluble wheel, vane, or helix and causes it to turn. This movement of the wheel is transmitted for instance to a disk bearing advertisements, or to a pointer which can be revolved so as to point to any one of a number of advertisements, and thus an automatically and constantly changing display or indication of advertising matter is secured. Or the advertisements may be borne by the wheel, vane or helix as hereinafter described. The movements of the ball or roller may be utilized for sounding a bell or gong and so on, as will be hereinafter more particularly described with reference to the accompanying drawings, in which:

Figure 1 is a vertical section of one form of the improved apparatus in a plane parallel with the plane of the advertisement disk and looking from rear to front of the device. Fig. 2 is an elevation of a portion of an advertising disk, a spider and a ratchet and pawl connection therefor as seen from the rear. Fig. 3 is an elevation showing the application of a device for registering the advertising disk in any one of a number of different positions. Fig. 4 is a side elevation of a portion of a modified form of spider. Fig. 5 is a transverse section of an apparatus embodying all of the elements illustrated by Figs. 1, 2 and 3. Fig. 6 is a longitudinal section of a modified form of apparatus in which a cylinder and helix are substituted for a disk and spider or paddle wheel. Fig. 7 is a sectional view of a portion of an apparatus embodying a vane or vanes on vertical shafts adapted to be revolved by a ball or balls or roller or rollers moving in the casing. Fig. 8 is a front elevation of an apparatus in which a human hand or the like is revolved so as to point to different positions, and Fig. 9 is a view similar to Fig. 8 in which hands like clock hands serve to indicate different advertisements.

Referring to Figs. 1 and 5 of the drawings the suitably supported portable casing *a* has revolubly mounted within it the disk *b* the face of which may be divided into sector shaped spaces by means of the radii shown by the dotted lines and each such space may contain a different advertisement. If this be the case then each advertisement may be viewed separately whenever it appears before a sector shaped window *c* in the front wall of the casing this window being indicated by dotted lines in Fig. 1. Fixed to the axle of the disk *b* is a six-armed spider *d* and each arm may if preferred carry at its free end a paddle *e*. Upon the floor of the casing *a* there is a ball or roller *f* which is free to roll to and fro according to the movements of the casing due to the vibrations or oscillations of the vehicle, boat or support by which the casing *a* is carried. The floor *g* may be concave as shown or plane or a straight or concave ball track may of course be mounted in the casing *a*, the essential feature being that the paddles *e* when they arrive in the lower position shall be in the path of the ball or roller *f*.

In operation the movements of the casing cause the ball or roller *f* to travel to and fro and as the ball strikes the particular one of the paddles *e* which is in its path it causes the spider *d* to partially revolve, the spider carrying with it the disk *b* so that a fresh portion of the latter is brought before the window *c* and fresh advertising matter is thus displayed.

Bells or gongs *h* may be arranged in suitable positions for being struck by the ball *f* or devices such as levers for operating or ringing.

In order that the to and fro movements of the ball *f* shall only cause the disk *b* to turn in one direction, there may be, if preferred, a ratchet and pawl connection or clutch between the spider *d* and the disk *b*. Such an arrangement is shown in Figs. 2 and 5 in which the ratchet *j* is shown fixed to the spider spindle and the pawl *k* is fixed to the rear face of the advertisement disk *b*. The device can be used, however, without the ratchet and pawl connection.

For the purpose of registering each sector of the disk *b* with the window *c* a hexagonal collar *l*, Figs. 3 and 5, may be fixed to the spindle of the disk *b* and a spring blade *m* or other device may be fixed to the rear wall of the casing *a* and be adapted to engage the lowermost face of the collar *l*, the spring *m* being only of just sufficient strength for arresting the disk in any one of the six desired positions. The collar and spring blade however are not essential to the successful working of devices constructed according to this invention.

According to a modification seen in Fig. 4 the paddles *e* are hinged as at *n* to the arms of the spider *d* in such a manner as to turn about the hinge *n* in one direction only, namely to the position shown by the dotted lines in Fig. 4. Therefore when the ball moves from right to left the spider is turned but when the ball moves from left to right the paddle *e* turns up about its hinge *n* and allows the ball *f* to pass without turning the spider *d*.

According to the modification illustrated in Fig. 6 a preferably transparent cylinder *o*, which may be circular, or polygonal, in cross section, is provided in the interior with a shaft *p* which may be carried by plain end bearings *q*, as shown, or by ball bearings. The cylinder *o* may be suitably fixed and the bearings *q* may be formed on end covers *q'* of the cylinder *o*. Within the cylinder a spiral or helix *s* is fixed to the shaft *o* and a ball *f* is adapted to run to and fro in the cylinder *o* the ball striking the helix *s* from time to time and thereby causing the helix *s* to turn. Now advertising matter may be placed upon the helix *s* and even on the ball *f*, or on the other hand the transparent cylinder may be lined with advertising matter visible through the transparent wall thereof. Bells *h* may be arranged on the shaft *p* as shown.

If desired, and as shown in Fig. 7, vertical or other shafts *x* may be mounted in the casing *a* conveniently in adjustable bearings and these shafts may carry vanes *y* as shown, or vertical helices, planes, or other devices which are moved around owing to their being struck by the moving ball *f* or balls, and these vanes or other devices may bear advertising matter, or the shaft *x* may carry advertising devices.

Fig. 8 shows a circular series of advertisements and a revoluble disk *b'* arranged centrally thereof and bearing the device of a human hand the index finger of which is extended so that as the disk is revolved by one of the agencies aforesaid the finger points from time to time to different advertisements in the series.

According to Fig. 9 the disk *b'* shown in Fig. 8 is replaced by a revolving clock hand *z* which is caused to move circularly by one of the agencies hereinbefore described and to indicate from time to time different advertisements in the series.

As examples of the moving bodies to which this apparatus may be attached mention may be made of railway carriages, tramcars, omnibuses, ships or boats, doors, tops of vans, sandwich boards, swinging signs, and so on.

It will be understood that such modifications and changes as fall within the scope of the appended claims may be resorted to without departing from the spirit or sacrificing any of the advantages of the invention.

I claim:

1. An advertising device comprising a revoluble body, supports therefor, a movable surface, a rolling body free to roll upon said movable surface, and means on said revoluble body adapted to constantly obstruct the path of said rolling body and adapted to turn said revoluble body under the impact of said rolling body.

2. An advertising device comprising a revoluble vane, supports therefor, a movable surface, a rolling body free to roll upon said movable surface within the range of said vane, and an advertisement display adapted to be changed by the action of said vane whenever the latter is revolved by the impact of said rolling body.

3. An advertising device comprising a movable surface, a rolling body free to roll thereon, bearing supports, a revoluble body free to turn thereon and so disposed that a peripheral portion is always in the path of said rolling body and an advertisement display in connection with said revoluble body.

4. An advertising device comprising a movable surface, a rolling body free to roll thereon, bearing supports, a revoluble multi-armed body free to turn therein and so disposed that the arms project into the path of said rolling body, and an advertisement disk connected with said revoluble body.

5. An advertising device comprising a movable ball track, a ball free to roll thereon, a spindle, bearing supports therefor, radiating projections on said spindle adapted to move into and out of the path of said ball and advertising devices in connection with said spindle.

6. An advertising device comprising a casing having a window, and a ball track, a vane revoluble in the casing, advertising means operated by the vane, and a rolling body adapted to move on and over the said track and arranged to engage the vane in a direction for revolving the same.

In testimony whereof I have hereunto set my hand in the presence of two subscribing witnesses.

ERNEST ALFRED HUCKLE.

Witnesses:
P. WOODWARD,
H. D. JAMESON.

Copies of this patent may be obtained for five cents each, by addressing the "Commissioner of Patents, Washington, D. C."